United States Patent
Huang

(10) Patent No.: US 9,380,637 B2
(45) Date of Patent: Jun. 28, 2016

(54) RELAY COMMUNICATION SYSTEM SUPPORTING MULTIPLE HOPS AND ACCESS METHOD THEREOF

(75) Inventor: Yada Huang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 254 days.

(21) Appl. No.: 13/389,523

(22) PCT Filed: Jul. 30, 2010

(86) PCT No.: PCT/CN2010/075606
§ 371 (c)(1),
(2), (4) Date: Feb. 8, 2012

(87) PCT Pub. No.: WO2011/020404
PCT Pub. Date: Feb. 24, 2011

(65) Prior Publication Data
US 2012/0140701 A1 Jun. 7, 2012

(30) Foreign Application Priority Data
Aug. 18, 2009 (CN) .......................... 2009 1 0162689

(51) Int. Cl.
*H04W 76/02* (2009.01)
*H04W 88/04* (2009.01)
(Continued)

(52) U.S. Cl.
CPC .............. *H04W 84/047* (2013.01); *H04W 8/26* (2013.01); *H04W 76/022* (2013.01)

(58) Field of Classification Search
CPC ...... H04W 84/047; H04W 88/04; H04B 7/14; H04B 7/15; H04B 7/155; H04B 7/15507; H04B 7/204; H04B 7/2043; H04B 7/2048; H04B 7/208; H04B 7/212; H04B 7/2128; H04B 7/216; H04B 7/24; H04B 7/26; H04B 7/2603; H04B 7/2606; H04B 7/2615; H04B 7/2621; H04B 7/2628; H04B 7/2659
USPC .................. 370/315–327; 455/7–25; 375/211
See application file for complete search history.

(56) References Cited

U.S. PATENT DOCUMENTS 6,658,011 B1 * 12/2003 Sevanto .................. H04L 29/06
370/401
(Continued)

FOREIGN PATENT DOCUMENTS

CN          101188800 A      5/2008
WO       2009009511 A2      1/2009

OTHER PUBLICATIONS

ZTE, Discussion of Multi-hop Relay, 3GPP TSG-RAN WG2 Meeting #67 R2-095011, Aug. 24-28, 2009.
(Continued)

*Primary Examiner* — Mark Rinehart
*Assistant Examiner* — Kenneth P Hunt
(74) *Attorney, Agent, or Firm* — Ling Wu; Stephen Yang; Ling and Yang Intellectual Property

(57) ABSTRACT

The present invention discloses a relay communication system supporting multiple hops comprising a first node, at least one second node and a core network, wherein the first node provides a wireless access connection to the at least one second node, and provides, as a gateway or a proxy, communication between the at least one second node and the core network. The present invention further discloses an access method of a relay communication system supporting multiple hops comprising: a second node residing in a first node and setting up an air interface connection with the first node; the second node setting up a connection with a core network through the first node; the first node forwarding, as a gateway, data between the second node and the core network, while acting as a core network gateway which serves the second node; and while acting as the core network gateway, setting up a connection with the second node under control of a Mobility Management Entity (MME) and allocating addresses; and the first node applying for creating channels and applying for addresses to a network element of the core network which serves the first node. In the present invention, data transmission rate is relatively rapid, and transmission modes are relatively flexible.

16 Claims, 12 Drawing Sheets

(51) Int. Cl.
  *H04W 88/16* (2009.01)
  *H04W 84/04* (2009.01)
  *H04W 8/26* (2009.01)

(56) References Cited

U.S. PATENT DOCUMENTS

| | | | | |
|---|---|---|---|---|
| 2007/0207806 | A1* | 9/2007 | Shaheen | H04W 68/00 455/436 |
| 2010/0046418 | A1* | 2/2010 | Horn | H04W 40/22 370/315 |
| 2010/0103857 | A1* | 4/2010 | Ulupinar | H04L 29/12207 370/313 |
| 2010/0103864 | A1* | 4/2010 | Ulupinar | H04L 29/12207 370/315 |
| 2010/0202343 | A1* | 8/2010 | Hunzinger | H04B 7/155 370/315 |
| 2010/0322197 | A1* | 12/2010 | Adjakple | H04B 7/155 370/332 |
| 2013/0203342 | A1* | 8/2013 | Morioka | H04B 7/15528 455/7 |
| 2013/0322322 | A1* | 12/2013 | Redana | H04W 24/10 370/315 |

OTHER PUBLICATIONS

NTT DOCOMO, Relay Requirements & Use Case Study in LTE-Advanced, 3GPP TSG-RAN2#66 R2-093281, May 4-8, 2009.
RAN3 LTE-A Rapporteur, LTE-A RAN3 Baseline Document, 3GPP TSG RAN WG3 Meeting #64 R3-091447, May 4-8, 2009.
International Search Report for PCT/CN2010/075606 dated Sep. 27, 2010.

\* cited by examiner

RELAY COMMUNICATION SYSTEM SUPPORTING MULTIPLE HOPS AND ACCESS METHOD THEREOF

TECHNICAL FIELD

The present invention relates to service transmission technologies in a relay link in a Long Term Evolution (LTE) system, and in particular, to a relay communication system supporting multiple hops and an access method of the relay communication system supporting multiple hops.

BACKGROUND OF THE RELATED ART

FIG. 1 is a structural diagram of a cellular wireless communication system, which, as shown in FIG. 1, is mainly comprised of a User Equipment (UE), an access network and a Core Network (CN). A network comprised of eNodeBs (eNBs), or comprised of eNBs and eNB controllers is referred to as a Radio Access Network (RAN), which is responsible for transactions of an access layer, such as radio resource management. Physical or logical connections may exist between the eNBs, and each eNB can be connected to more than one core network nodes. The core network is responsible for transactions of a non-access layer, such as location update, etc. The core network is an anchor point of a user plane. The UE refers to various devices, such as mobile phones or laptop computers, etc., which can communicate with cellular wireless communication network.

In the cellular wireless communication system, wireless coverage of a fixed eNB network is limited due to various reasons, for example, block of wireless signals by various building structures causes coverage leak existing in the coverage of the wireless network. On the other hand, at edge regions of a cell, attenuation of wireless signal strength and interferences between adjacent cells results in poor communication quality of the UE when being at edges of the cell and rise of the error rate of wireless transmission. In order to improve the coverage rate of data rate, group mobility, temporary network deployment, throughput at edge regions of the cell and coverage of a new area, a scheme is provided for introducing a wireless network node, which is referred to as a relay, in the cellular wireless communication system.

The relay is a station which relays data between other network nodes through a wireless link and can control information functions, and is also referred to as a relay node/relay station. FIG. 2 is a structural diagram of a cellular wireless communication system containing a relay. As shown in FIG. 2, the UE which is served directly by the eNB is referred to as a macro UE, and the UE which is served by the relay is referred to as a relay UE. Interfaces between various network elements are defined as follows: a direct link is a wireless link between the eNB and the UE, including an uplink/downlink (DL/UL) direct link; an access link is a link between the relay and the UE, including a DL/UL access link; and a backhaul link is a wireless link between the eNB and the relay, including a DL/UL backhaul link.

The relay may relay data by various methods, such as directly amplifying a received radio signal transmitted by the eNB; or processing, such as demodulating or decoding, data transmitted by the eNB accordingly after receiving the data, and then forward the data to the UE, or the eNB and the relay cooperatively transmitting data to the UE, and conversely, the relay will also relay the data transmitted from the UE to the eNB.

Among many types of relay, characteristics of one type of relay will be described as follows: the UE can not distinguish cells under the relay from those under the fixed eNB, i.e., from the perspective of the UE, the relay itself is a cell and has no difference from the cell under the eNB. Such cell can be referred to as a relay cell. The relay cell has its own Physical Cell Identity (PCI), and transmits broadcast like ordinary cells. When the UE resides in the relay cell, the relay cell can individually allocate and schedule radio resources to the UE for use, and can be independent of radio resource scheduling of the eNB participating in the relay. The eNB to which the relay is connected through a backhaul link is referred to as a Donor NodeB/eNodeB (DNB/DeNB). The interface and protocol stack between the relay cell and the relay UE are the same as those between an ordinary eNB cell and an ordinary UE.

FIG. 3 is a structural diagram of a LTE based cellular wireless communication system. As shown in FIG. 3, the LTE system uses an Internet Protocol (IP) based flattened architecture, and is comprised of an Evolved Universal Terrestrial Radio Access Network (E-UTRAN), an Evolved Packet Core (EPC) node and other support nodes. The EPC node includes a Mobility Management Entity (MME), a Serving Gateway (S-GW) and a Packet Data Network Gateway (P-GW). The MME is responsible for control plane signaling, including control plane related operations, such as mobility management, non-access layer signaling processing, user mobility management, context management, etc; and the S-GW is responsible for transmitting, forwarding, routing handoff of UE user plane data. The eNBs are logically connected to each other via an X2 interface, which is used to support the mobility of the UE within the entire network to ensure seamless handoff of the user. The P-GW is a node which connects the EPC with a packet data network, such as Internet, and is responsible for allocating an IP address of the UE, filtering IP data packets by service type into service data flows and binding the service data flows to a corresponding transmission bearer, and so on.

Each eNB is connected to a System Architecture Evolution (SAE) core network via a S1 interface, i.e., is connected to the MME via a control plane S1-MME interface, is connected to the S-GW via a user plane S1-U interface. The S1 interface supports multipoint connections between the eNB and the MME and S-GW. The MME and the S-GW are connected via a S11 interface, the S-GW and the P-GW are connected via a S5 interface and can also be combined into one network element, and at this point, the S5 interface does not exist. The eNBs are connected with each other via an X2 interface. Each eNB transmitting signaling and data to the UE via an Uu interface (which is originally defined as a wireless interface between the UTRAN and the UE). After the relay is introduced, the wireless interface between the relay and the eNB is an Un interface, and the interface between the relay and the UE is the same as that between the eNB and the UE and thus is also an Uu interface.

Usually, operators deploy relays for several reasons, such as lack of terrestrial transmission resources, or a single relay cannot satisfy requirements of extensive or long distance network layout and can only be deployed around an eNB having terrestrial transmission resources when the terrestrial transmission cannot operate in the event of a disaster or the mobile cellular network is deployed rapidly in a short time. Therefore, in order to solve the problem of deployment scope, the concept of multiple hops is introduced, i.e., after accessing the eNB, the relay can further continue to act as an access node of subsequent relays, so as to form a multi-hop structure.

CONTENT OF THE INVENTION

In view of this, a main object of the present invention is to provide a relay communication system supporting multiple hops and an access method of the relay communication system supporting multiple hops so as to implement data transmission in the multi-hop relay communication system in relatively flexible transmission modes.

In order to achieve the above object, the technical scheme of the present invention is implemented as follows:

The present invention provides a relay communication system supporting multiple hops comprising a donor node, at least one host node and a core network, wherein the donor node provides a wireless access connection to the at least one host node, and provides, as a gateway or a proxy, communication between the at least one host node and the core network.

Preferably, the donor node includes a relay or an eNB; and the host node is a relay.

Preferably, while acting as the proxy, the donor node is regarded as a core network for the host node, and is regarded as a host node for the core network; and the donor node receives a message of the proxy to forward to a target network element of the proxy.

Preferably, the donor node converts, as a gateway, a message of a received protocol/protocol stack into a message of a protocol/protocol stack to be transmitted and transmits the message.

Preferably, during the conversion of the messages, protocol conversion is not performed on bearer portions of the protocol/protocol stack and the protocol/protocol stack to be transmitted in the messages.

Preferably, the donor node provides a wireless access connection for a User Equipment (UE) connected to the host node.

Preferably, the wireless access connection is based on wireless cellular technologies, including Global System for Mobile Communication (GSM), Universal Mobile Telecommunications System (UMTS) and Long Term Evolution (LTE).

The present invention provides an access method of a relay communication system supporting multiple hops comprising:

a host node residing in a donor node and setting up an air interface connection with the donor node;

the host node setting up a connection with a core network through the donor node;

the donor node forwarding, as a gateway, data between the host node and the core network, while acting as a core network gateway which serves the host node; and while acting as the core network gateway, setting up a connection with the host node under control of a Mobility Management Entity (MME) and allocating addresses; and the donor node applying for creating channels and applying for addresses to a network element of the core network which serves the donor node.

Preferably, the donor node includes a relay or an eNB; and the host node is a relay.

Preferably, the process of setting up the air interface is a RRC connection setup process; and the process of setting up the connection with the core network is an attach process.

Preferably, the core network gateway includes a Service Gateway (SGW) and/or a Packet data network Gateway (PGW).

Preferably, the donor node applying for creating the channels and applying for the addresses to the network element of the core network which serves the donor node is triggered when the donor node sets up the connection with the host node under control of the MME and allocates the addresses while acting as the core network gateway.

The present invention provides an access method of a relay communication system supporting multiple hops comprising:

a host node residing in a donor node and setting up an air interface connection with the donor node;

the host node setting up a connection with a core network through the donor node; and while acting as a proxy, the donor node being regarded as a core network for the host relay and being regarded as a host node for the core network; and while acting as a core network gateway, the donor node serving the host node.

Preferably, the donor node being regarded as the core network specifically is that:

the donor node acts as a proxy of a core network MME and a proxy of the core network gateway; while acting as the proxy of the core network MME, the donor node is regarded as a MME for the host node and is regarded as a host node for the MME; and while acting as the proxy of the core network gateway, the donor node is regarded as a core network gateway.

Preferably, while acting as the core network gateway, the donor node sets up the connection with the host node under control of the MME and allocates addresses Preferably, the core network gateway includes a SGW and/or a PGW.

In the communication system supporting multiple hops in accordance with the present invention, donor relays (multi-hop) or DeNBs (single-hop or multi-hop) may be set as transit gateways for user data by various wireless sub-network connections between relays or between the relay and the DeNB so as to forward interactive data between the user data and an EPC through these set gateways (the donor relays or the DeNBs), thus supporting UE access and implementing corresponding services. Or, a data forwarding manner for directly forwarding the user data to the EPC is provided on the relays, the donor relays or the DeNBs, and the direct interaction (logically) between the user data and the EPC is implemented by setting underlying forwarding configuration on the above network elements. In the present invention, the wireless sub-network configuration between the relays or between the relay and the DeNB is flexible, the data transmission rate is relatively rapid, the supported bandwidth is relatively wide, and the data transmission can be implemented in the multi-hop relay communication systems in relatively flexible transmission modes.

PREFERRED EMBODIMENTS OF THE PRESENT INVENTION

The basic idea of the present invention is that: in a communication system supporting multiple hops in accordance with the present invention, donor relays (multi-hop) or DeNBs (single-hop or multi-hop) may be set as transit gateways for user data by various wireless sub-network connections between relays or between the relay and the DeNB so as to forward interactive data between the user data and an EPC through these set gateways (the donor relays or the DeNBs), thus supporting UE access and implementing corresponding services. Or, a data forwarding manner for directly forwarding the user data to the EPC is provided on the relays, the donor relays or the DeNBs, and the direct interaction (logically) between the user data and the EPC is implemented by setting underlying forwarding configuration on the above network elements. In the present invention, the wireless sub-network configuration between the relays or between the relay and the DeNB is flexible, the data transmission rate is relatively rapid, the supported bandwidth is relatively wide, and the data transmission can be implemented in the multi-hop relay communication systems in relatively flexible transmission modes.

In order for objects, technical schemes and advantages of the present invention to be more clear and apparent, the present invention will be further described in detail by way of example and in combination with accompanying drawings.

Figure 1:
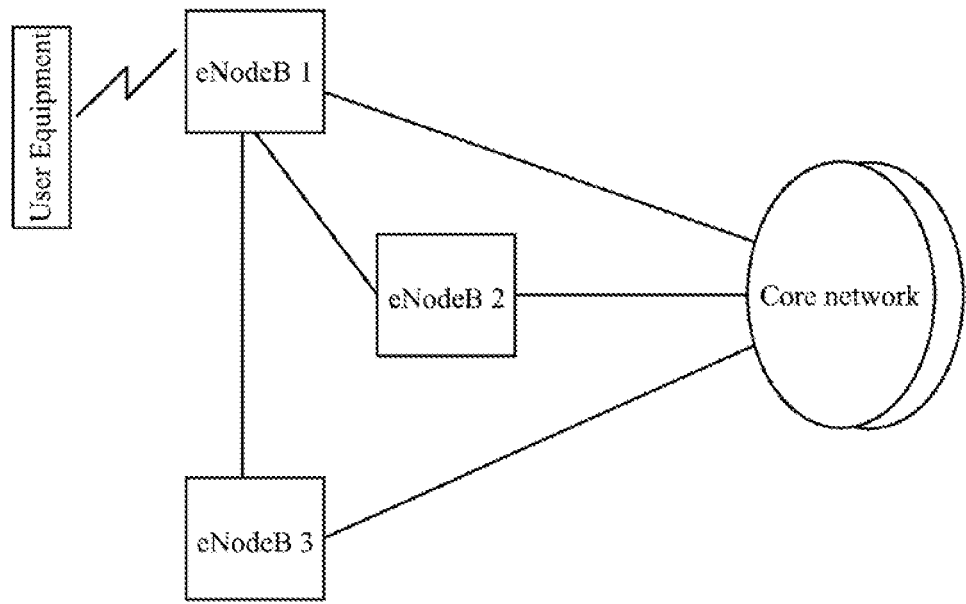
FIG. 1 is a structural diagram of a cellular wireless communication system.
Figure 2:
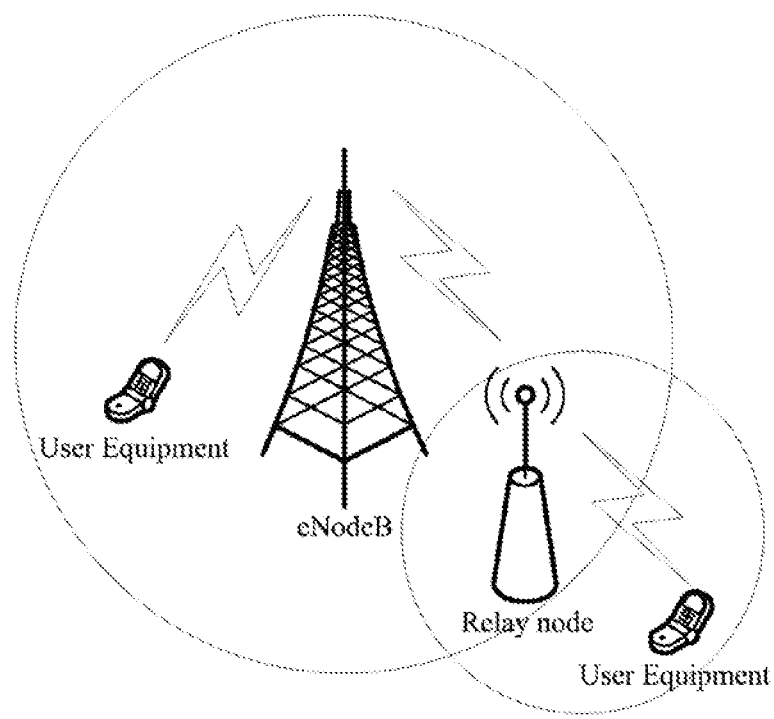
FIG. 2 is a structural diagram of a cellular wireless communication system containing a relay.
Figure 3:
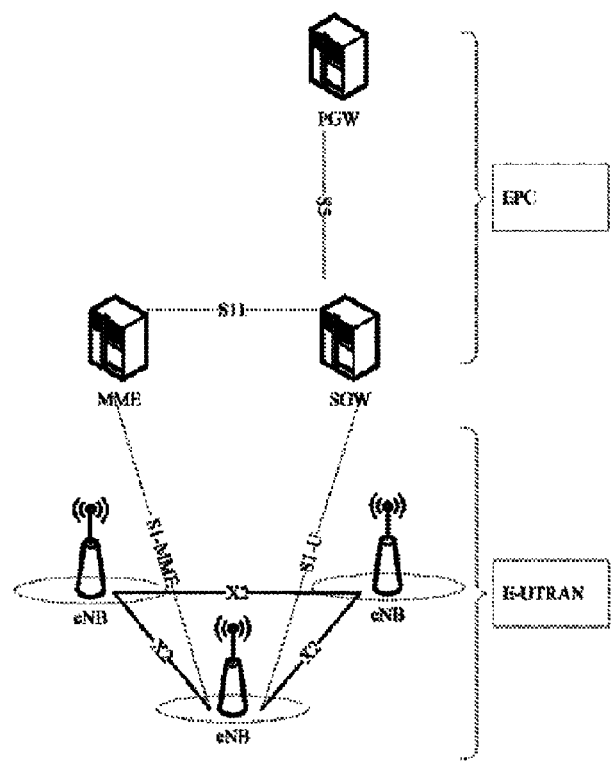
FIG. 3 is a structural diagram of a LTE based cellular wireless communication system.
Figure 4:
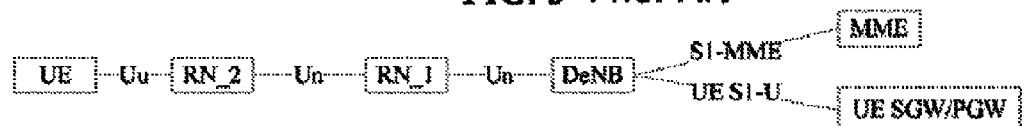
FIG. 4 is a structural diagram of the first wireless relay multi-hop communication system according to the present invention.

FIG. 4 is a structural diagram of the first wireless relay multi-hop communication system, which, as shown in FIG. 4, includes relay1 (wireless node RN1) and relay2 (RN2). Relay 1 is a relay connected to an eNB, which is also referred to as a donor eNB (DeNB), via a wireless interface; relay2 is connected to relay1 via a wireless interface, and at this point, relay1 acts as a donor, and may be referred to as a donor relay.

In the multi-hop relay system, the donor relay node converts, as a protocol conversion node, communication protocols of relays under the donor relay node and a donor network element in which the donor relay node is located. In the existing network architecture, this type of protocol conversion network element is referred to as a gateway. In a single relay system, the DeNB is a gateway, which connects the relay with a MME or SGW/PGW of a core network.

Figure 5:
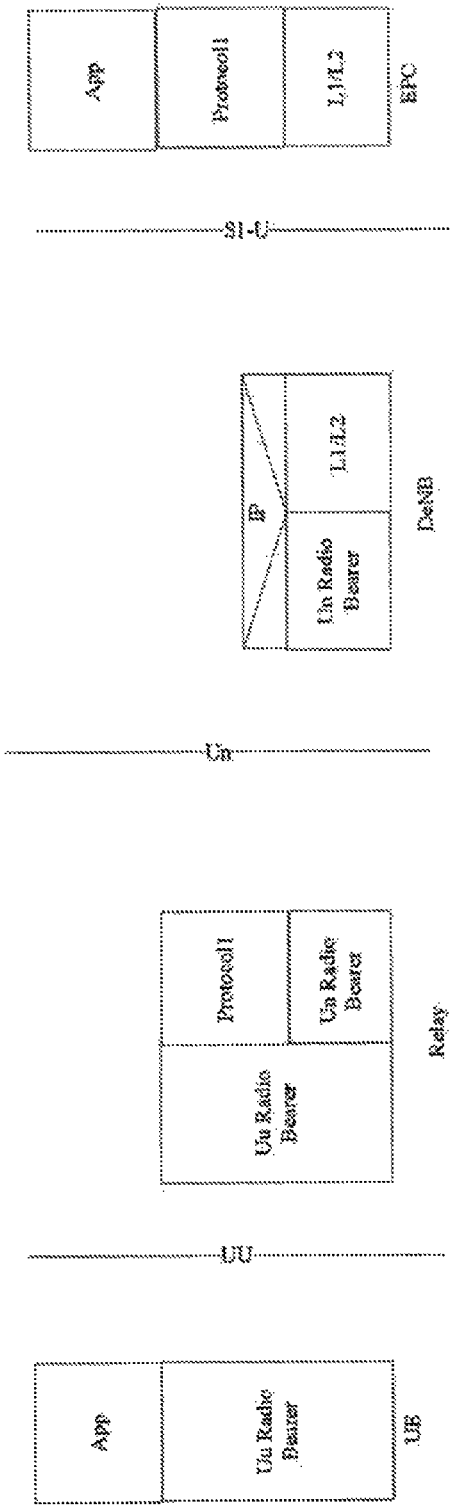
FIG. 5 is a schematic diagram of a protocol stack of a single relay system according to the present invention.

FIG. 5 is a schematic diagram of a protocol stack of a single relay system according to the present invention. As shown in FIG. 5, the relay is a single eNB for the UE, and therefore, the relay will encapsulate service protocol (APP) data of the UE into protocol1 of a transmission network (which is a transmission network between a DeNB and a EPC) as an ordinary eNB does. Protocol1 is an IP-based protocol, for example, the protocol stack structure of protocol1 is IP/SCTP/S1-AP from top to bottom for a control plane, and the protocol stack structure of protocol1 is IP/UDP/GTP-U from top to bottom for a user plane. Protocol1 is transmitted via a radio bearer of an Un interface, and therefore, operations implemented by the protocol of the radio bearer are basically operations at physical layer and link layer. When data packets reach a gateway, i.e., a DeNB, the DeNB converts protocols under the link layer, i.e., converts the radio bearer of the Un interface and L1/L2 at the ground side. When converting the protocols, there is no change in the upper layer protocol stack, and the gateway converts a source protocol stack into a target protocol stack based on the internal conversion relationship.

Figure 6:
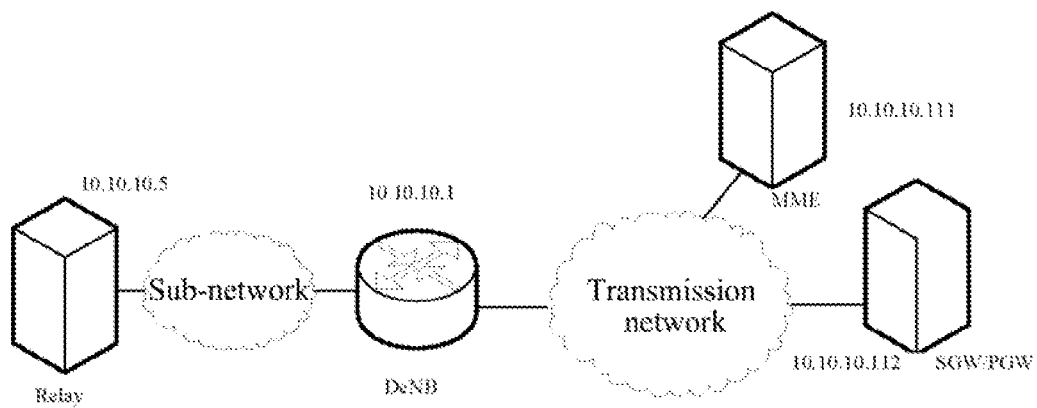
FIG. 6 is a structural diagram of the second wireless relay multi-hop communication system according to the present invention.

FIG. 6 is a structural diagram of the second wireless relay single-hop communication system according to the present invention. As shown in FIG. 6, a relay is directly connected to a DeNB through a wireless sub-network, including a wireless cellular technology based network, such as Global System for Mobile Communication (GSM) system, Universal Mobile Telecommunications System (UMTS) and its evolved network, or a communication network, such as LTE system. The DeNB is connected to an EPC (MME, or SGW/PGW) through a wired transmission network, such as IP-based Internet, etc. APP data of the UE which reaches the relay is packed into protocol1, such as a tunnel protocol. Data packets at the Un interface are an Un radio bearer, an IP, an UDP, a GTP-U and an APP from top to down according to the protocol stack. After the data packets reach the DeNB, the portion under the link layer will be converted into a L1/L2 protocol, and other portions remain unchanged. Upon conversion, the gateway can use the stored routing information, for example, only when the destination address of the IP is the relay, the DeNB can convert data packets of the transmission network into data packets of Un.

Figure 7:
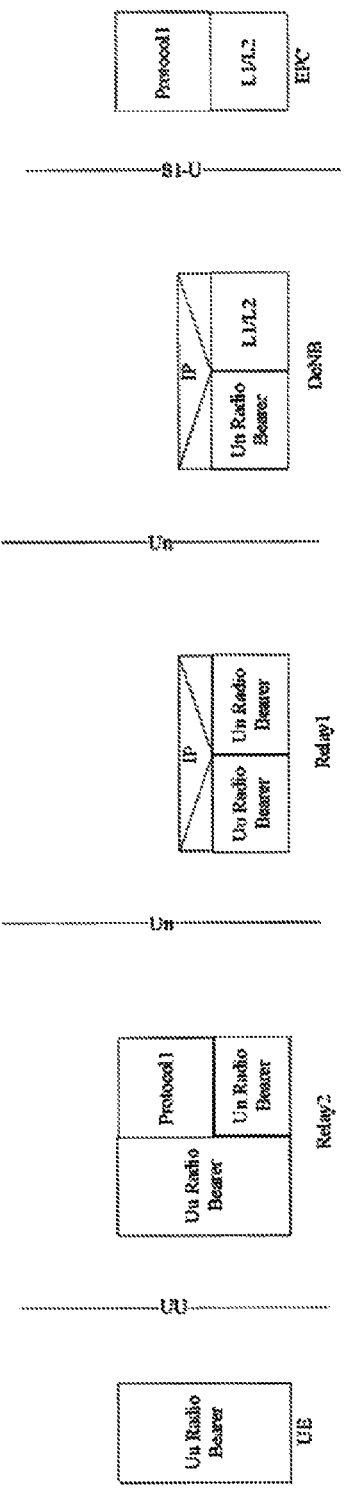
FIG. 7 is a schematic diagram of a protocol stack of a relay system supporting multiple hops according to the present invention.
Figure 8:
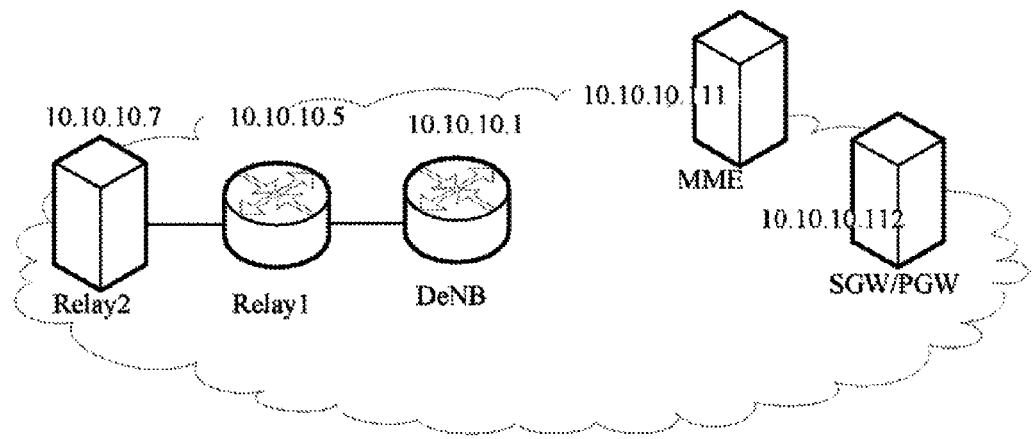
FIG. 8 is a structural diagram of the third wireless relay multi-hop communication system according to the present invention.

FIG. 7 is a schematic diagram of a protocol stack of a relay system supporting multiple hops according to the present invention. As shown in FIG. 7, the protocol stack is a schematic diagram of two hops, and relay2 is connected to relay1, which acts as a donor relay node and is connected to a DeNB. Relay1 provides conversion of protocols under the link layer to convert an Un radio bearer between relay2 and relay1 into a Un radio bearer between relay1 and the DeNB. Relay1 can determine whether to convert protocols for data packets based on its own stored route relationship. FIG. 8 is a structural diagram of the third wireless relay multi-hop communication system according to the present invention. As shown in FIG. 8, network elements as shown are connected based on the IP network from the perspective of a transmission network between a DeNB and an EPC. A forwarding mechanism for directly forwarding APP data of the UE to the EPC is provided on relay2, relay1 and the DeNB. When each network element forwards APP data packets, forwarding paths used are different, and forwarding implementations between these network elements may also be different. For example, if relay1 receives data packets with the destination address being 10.10.10.7, the data packets will be forwarded, and if relay1 receives data packets with the destination address being 10.10.10.5, it will process the data packets itself. Under such architecture, all network elements are in the same IP transmission network. Any two network elements can communicate with each other by using any IP-based protocol according to the IP route relationship. Protocol1 is a transmission protocol used by the EPC, such as IP/SCTP/S1-AP, IP/UDP/GTP-C of a control plane, or IP/UDP/GTP-U of a user plane.

Figure 9:
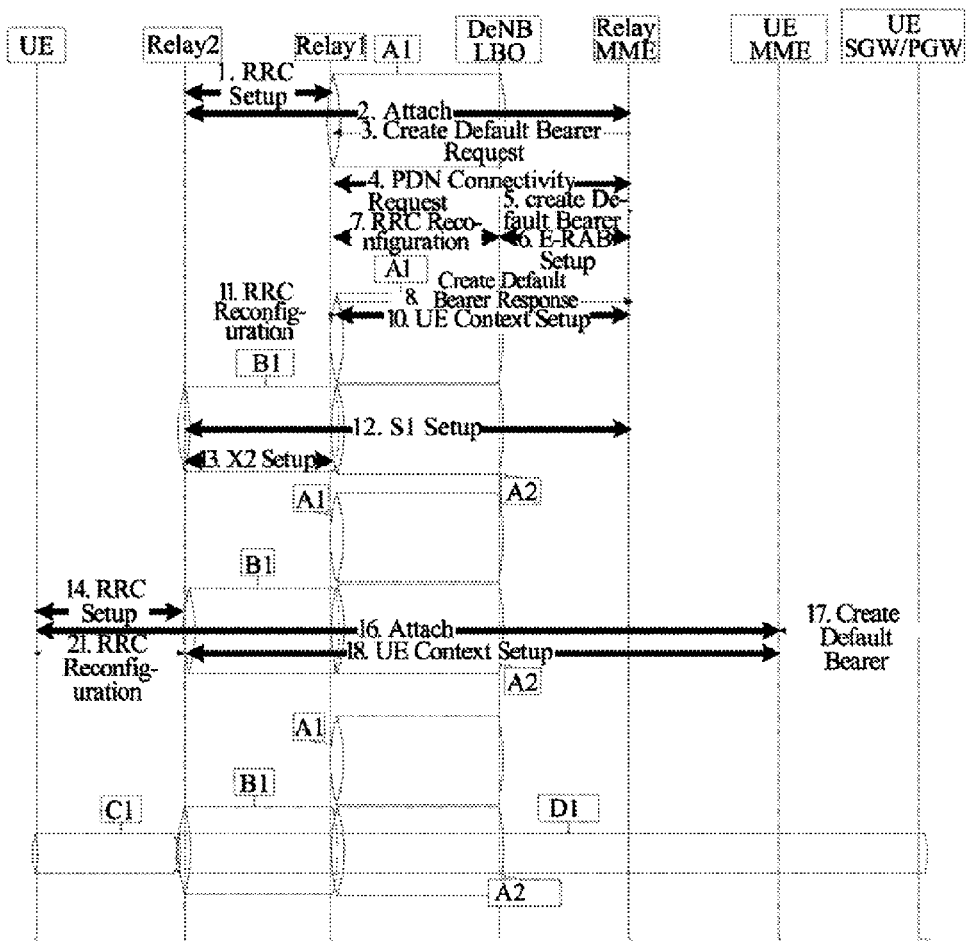
FIG. 9 is a flowchart of a process in which a relay accesses a donor relay and a UE accesses the relay connected through the donor relay in a multi-hop system according to the present invention.

FIG. 9 is a flowchart of a process in which a relay accesses a donor relay and a UE accesses the relay connected through the donor relay in a multi-hop system according to the present invention. As shown in FIG. 9, not all signaling is shown in this example, and most of the procedure is the same as the access procedure of the existing LTE system, and will not be described in detail in this example, and only steps which are different from those of the existing procedure will be particularly described. A relay MME and a UE MME illustrated in FIG. 9 may be the same network element, and are separately illustrated here only for convenience of description. Before relay2 accesses the donor relay, i.e., relay1, relay1 has accessed the DeNB. See the multi-hop relay communication system shown in FIG. 6, relay2 resides, as a UE, in relay1, and initiates a RRC connection process shown in step 1 in FIG. 9 to set up a RRC connection after reading system broadcast. After the setup of the RRC connection is completed, a signaling channel which can transmit RRC signaling has been created between relay1 and relay2. Relay2 then initiates an attach (as shown in step 2 in FIG. 9). The attach is a Non Access Stratum (NAS) protocol. At the Un interface, the NAS protocol is firstly carried to relay1 through RRC signaling, and relay1 transmits an S1 initial direct message to a relay MME through a user plane transmission channel and radio bearer (A1). At this point, relay2 is accessed as a UE, the NAS message may be considered as APP, the radio bearer is an air interface signaling protocol, i.e., RRC, and protocol1 is IP/SCTP/S1-AP. Relay1 converts, as an eNB, the bearer of the NAS into IP/SCTP/S1-AP through the RRC signaling, and forwards it to a MME to which relay1 corresponds. As shown in FIG. 8, in order to create the multi-hop relay communication system, an IP address is required to be allocated to relay2, and the route relationship between relay1 and the DeNB is required to be updated. In order to reduce the impact on existing protocols, the process is implemented by using the existing protocol procedure instead of defining a new protocol procedure. Therefore, in the attach process, relay2 will notify the MME in the signaling that it is desirable that the SGW/PGW is the eNB which relay2 accesses, which in this scene is a donor relay of relay2, i.e., relay1. The MME can confirm relay1 through another end to which the S1-AP is connected. The MME treats relay1 as an SGW/PGW, transmits a GTP-C message, and demands to create a default bearer in step 3, including allocating an IP address. Relay1 itself has only one IP address, which is also required to be routed by the DeNB. Relay1 demands to support multi-PDN, i.e., a plurality of PDN connections can be activated. As a UE, relay1 initiates a Packet Data Network (PDN) connection request of step 4 to the MME to which relay1 corresponds, requests to set up another PDN connection, allocates another IP, and demands to use the eNB to which relay1 corresponds as the SGW/PGW. The MME creates a default bearer through step 5, and allocates the corresponding IP by treating the DeNB as the SGW/PGW. The DeNB allocates IP addresses itself or allocates IP addresses through modes, such as local Dynamic Host Configuration Protocol (DHCP), and stores a route relationship. After step 5 ends, the MME assigns a message through E-RAB of S1-AP of step 6 to inform the UE, i.e., the eNB to which relay1 corresponds, i.e., the DeNB, which carries an attach response message, and demands to create a new EPS bearer. After the DeNB receives the message, the Un interface is reconfigured based on configuration information in step 7 which is required to be configured, creates a radio bearer (A2) of a new EPS bearer, and transmits the attach response message of the NAS to relay1 through the message in step 7. Until now, there are an IP of relay1 and a new allocated IP in a route table of the DeNB, and relay1 has an IP to be allocated. Relay1 transmits, as the SGW/PGW, a reply response message in step 3 to the MME to which relay2 corresponds (step 8), brings the new allocated IP address back, and create the route relationship. After receiving the message, the MME of relay 2 transmits a UE context setup to the eNB to which relay2 corresponds, i.e., relay1 (step 10). After receiving the UE context setup of S1, relay1 reconfigures the Un connection at the air interface to create a wireless bearer (B1), carries the attach response message of relay2, and creates an air interface user plane transmission channel between relay1 and relay2. Until now, relay2 has a newly allocated IP, and both relay1 and the DeNB have a route relationship of the IP. As shown in FIG. 8, relay2 has an independent IP of a transmission network, and can be connected to any network element in the network through the IP protocol. When the UE accesses relay2, the UE can create a transmission channel to the UE SGW/PGW through the UE access process of steps 14-21, and the UE can enter a service network used by the APP, such as Internet, through the UE SGW/PGW.

Figure 10:
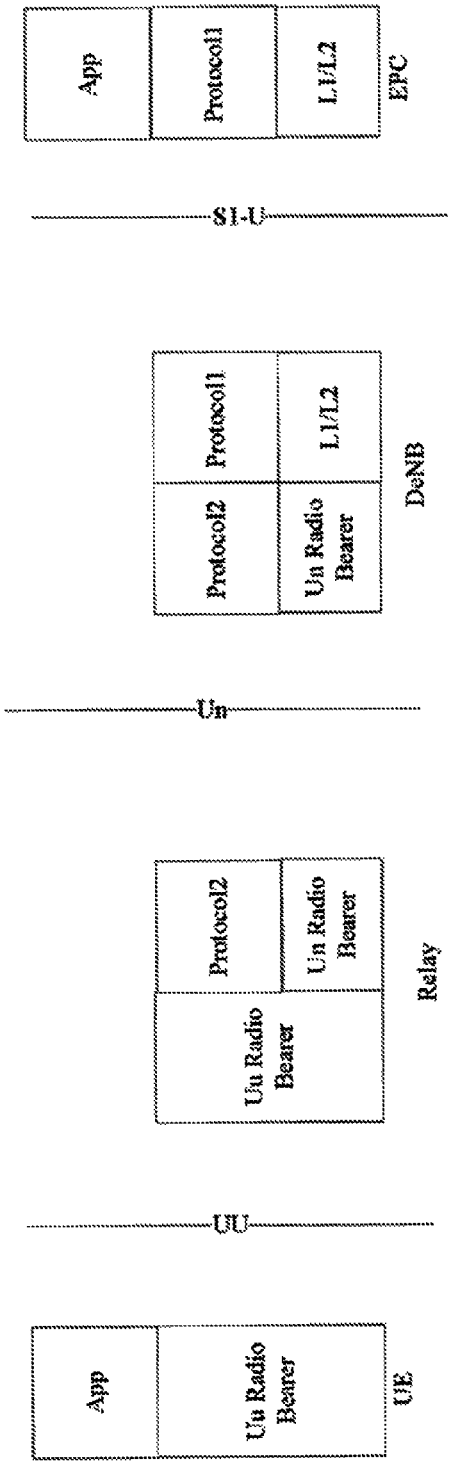
FIG. 10 is schematic diagram of a protocol stack of another single relay system.

FIG. 10 illustrates a protocol stack of another single relay system. Compared with the protocol stack illustrated in FIG. 5, the difference is that the extent of protocol conversion of the DeNB is expanded to the transmission layer, specifically, protocols under the transmission are converted, i.e., conversion between protocol2 and the radio bearer of the Un interface and protocol1 and ground side L1/L2 is performed. The transmission layer here refers to a transmission protocol at the network side for transmitting service data. When the protocol is converted, there is no change in the upper layer protocol stack, and the gateway converts a source protocol stack into a target protocol stack according to an internal conversion relationship. Protocol2 represents a protocol supported by a sub-network between the relay and the DeNB.

Figure 11:
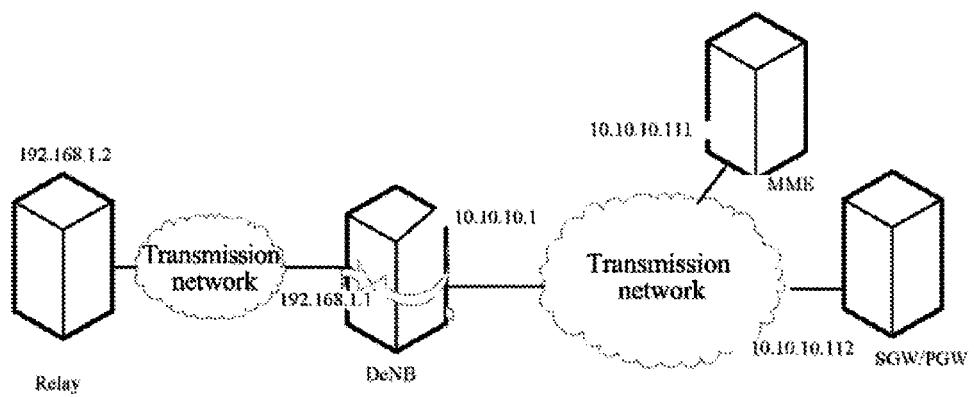
FIG. 11 is a structural diagram of a communication system of the protocol stack illustrated in FIG. 10.

FIG. 11 is a structural diagram of a communication system of the protocol stack illustrated in FIG. 10. APP data of the UE which reaches the relay is packed into protocol2, such as a tunnel protocol, and data packets of the Un interface are an Un radio bearer, an IP, an UDP, a GTP-U and an APP from top to bottom from the prospective of the protocol stack. After the data packets reach the DeNB, the portions under the APP will be converted into L1/L2 protocol and protocol1, and the APP portion will remain unchanged. Assume that protocol1 is also a tunnel protocol. Upon conversion, a gateway can convert data on both sides of the gateway by using the stored mapping information, for example, according to the mapping relationship between a pair of IP+GTP-U TEID of the protocol stack. For example, the DeNB receives a data packet with a target IP1=192.168.1.1 and a target TEID1=10 from the relay, and finds out a matching item based on the stored mapping relationship, and converts the matching item into a data packet with a target IP2=10.10.10.112 and a target TEID2=20 and forwards the data packet to an SGW/PGW of a core network. Of course, the protocol1 and protocol2 described above are not necessarily the same. For a gateway of a heterogeneous network, for example, protocol2 is a simplified tunnel protocol and needs not to be carried on the IP, and its Tunnel Identifier (TID)=128. Then, a mapping table inside the gateway means that TID=128 corresponds to target IP=10.10.10.112 and target TEID=20, and the forwarding of the data packets will construct IP/UDP/GTP-U data packets of protocol1 between the DeNB and the SGW/PGW based on the mapping relationship.

Figure 12:
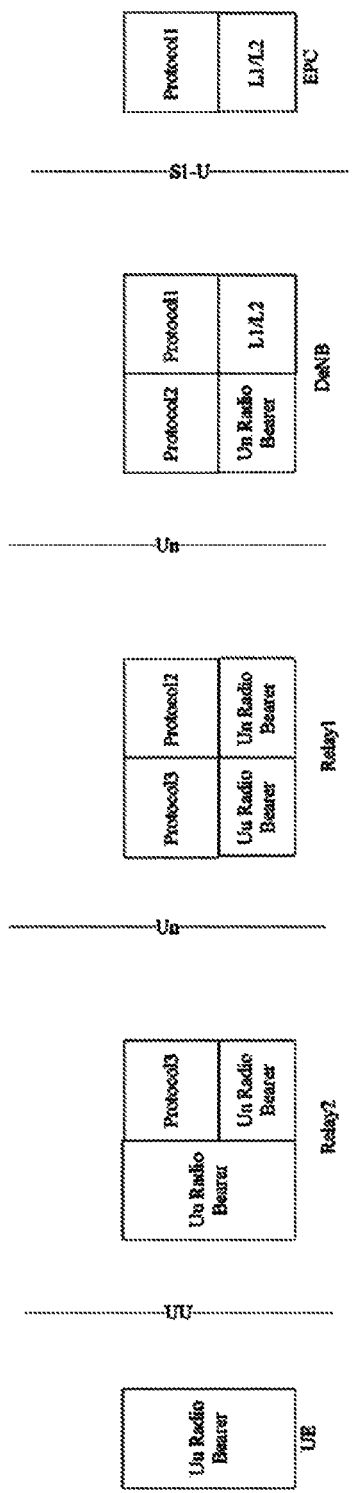
FIG. 12 is a schematic diagram of a protocol stack of another multi-hop relay system.
Figure 13:
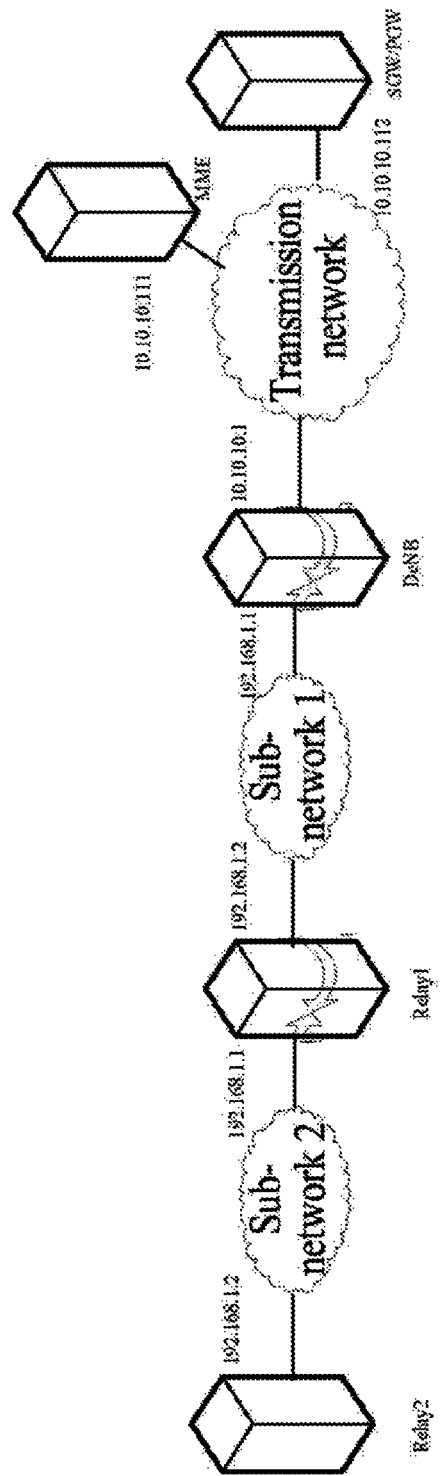
FIG. 13 is a structural diagram of the fourth wireless relay multi-hop communication system according to the present invention.

FIG. 12 is a schematic diagram of a protocol stack of another multi-hop relay system. As shown in FIG. 12, relay1 provides, as a donor relay node, conversion of protocols under the transmission layer to convert a Un radio bearer and protocol3 between relay2 and relay1 into a Un radio bearer and protocol2 between relay1 and the DeNB. Relay1 can determine whether to converts protocols for data packets based on whether there is a matching item in its stored conversion relationship table. As described above, the donor relay supports the conversion of homogeneous protocols and the conversion of heterogeneous protocols. FIG. 13 is a structural diagram of the fourth wireless relay multi-hop communication system according to the present invention. As shown in FIG. 13, connection interfaces between the network elements as shown can be considered to constitute their own sub-network, such as sub-network1 between relay1 and relay2, sub-network2 between relay2 and the UE. The protocol used by the sub-network may be an IP based route protocol. As there are only two network elements in the sub-network, the protocol used by the sub-network may be a point-to-point based protocol. For example, different point-to-point data streams are represented by simple tunnel identifiers or stream identifiers. Nodes between both sub-networks translate the homogeneous or heterogeneous protocols.

Figure 14:
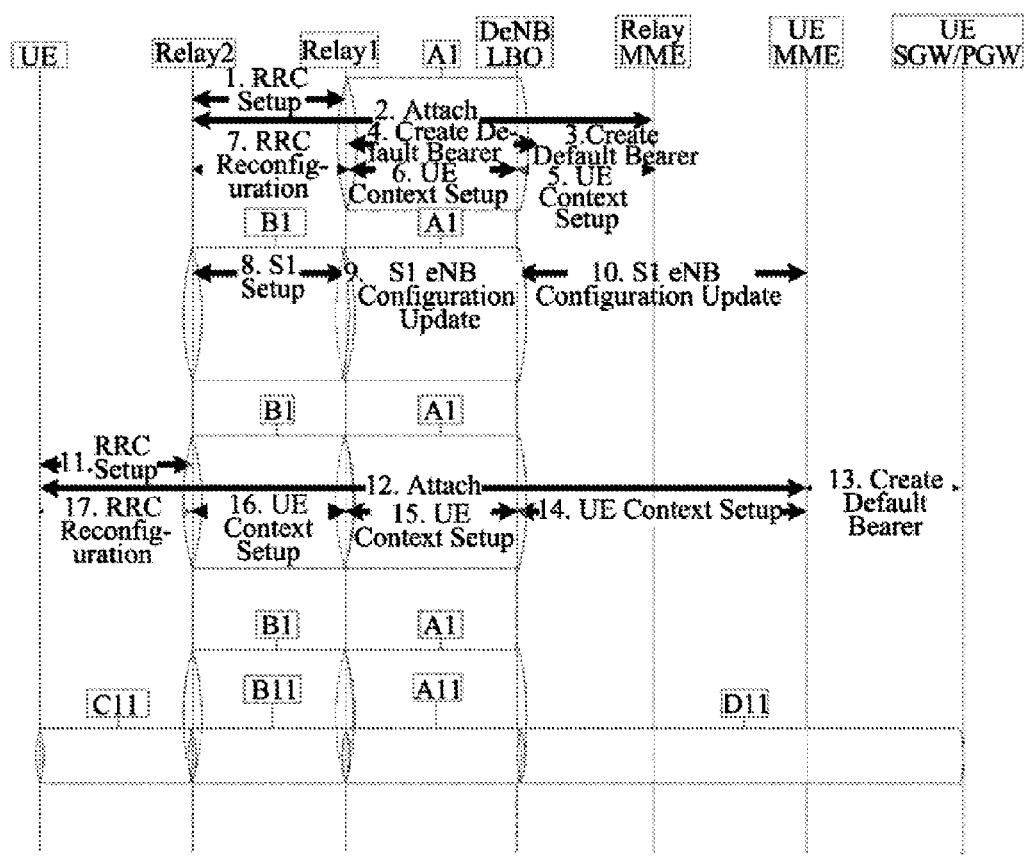
FIG. 14 is a flowchart of a process in which a relay accesses a donor relay and a UE accesses the relay connected through the donor relay in a multi-hop relay communication system according to the present invention.

FIG. 14 is a flowchart of a process in which a relay accesses a donor relay and a UE accesses the relay connected through the donor relay in a multi-hop relay communication system according to the present invention. As shown in FIG. 14, not all signaling is shown in this example, and most of the procedure is the same as the access procedure of the existing LTE system. A relay MME and a UE MME illustrated in FIG. 14 may be the same network element, and are separately illustrated here only for convenience of description. Before relay2 accesses a donor relay, i.e., relay1, relay1 has accessed a DeNB and its structure is shown in FIG. 11. Relay2 firstly resides, as a UE, in relay1, and initiates a RRC connection process of step 1 to set up a RRC connection after reading system broadcast. After step 1 is completed, a signaling channel which can transmit RRC signaling between relay1 and relay2 has been created. Relay2 then initiates an attach process of step 2. The attach is a NAS layer protocol. At the Un interface, the NAS layer protocol is firstly carried to relay1 through RRC signaling, and relay1 transmits an S1 initial direct message to the DeNB through a user plane transmission channel and radio bearer (A1). At this point, relay2 is a UE, the NAS message may be considered as APP, the radio bearer is an air interface signaling protocol, i.e., RRC, and protocol2 is IP/SCTP/S1-AP or S1-AP. Relay1 converts, as an eNB, the bearer of the NAS into the IP/SCTP/S1-AP signaling bearer (target IP=192.168.1.1, source IP=192.168.1.2, common S1 message) through the RRC signaling containing downlink destination eNB S1-AP ID=22 and forwards it to the DeNB. As shown in FIG. 13, in order to create the multi-hop relay architecture, a mapping relationship of corresponding protocols is required to be created at a gateway between each sub-network, in this example, a new corresponding relationship is required to be added to relay1 and the DeNB. Typically, such protocol mapping relationship across sub-networks needs a pair of protocol conversion maintenance corresponding relationship tables, and different types of protocols are required to be separated, for example, the corresponding relationship of IP/UDP/GTP-U and the corresponding relationship of IP/SCTP/S1-AP are required to be maintained separately. In this embodiment, taking Protocol1/2/3 all using the homogeneous network as an example, three pairs of protocols are required to be converted, which are IP/UDP/GTP-U protocols of the user plane, IP/SCTP/S1-AP protocols of the control plane, and IP/UDP/GTP-C protocols of the control plane, respectively. The described protocol conversion only differs in identities of the corresponding relationship for the heterogeneous network, and therefore, only the signaling for transferring the identities needs to be slightly modified, as described above in the process of FIG. 11, for example. After receiving the signaling, the DeNB converts the IP/SCTP/S1-AP into a new protocol packet (target IP=10.10.10.111, source IP=10.10.10.1, common S1 message), and carries downlink destination eNB S1-AP ID=12 in the signaling, forwards it to a MME, and locally stores the corresponding relationship between (IP=192.168.1.2, eNB S1-AP ID=22) and (IP=10.10.10.1, eNB S1-AP ID=12) for conversion of downlink IP/SCTP/S1-AP protocols. The MME receives an attach request of the NAS layer carried in the S1-AP signaling to demand to create a local bearer, and therefore, the MME selects the corresponding eNB, i.e., the DeNB, as the SGW/PGW to create a bearer, transmits a creating default bearer (target IP=10.10.10.1, source IP=10.10.10.111, common GTP-C message) of step 3, and carries uplink TEID-C=111 and possible source UE-related information. For example, S1-AP ID=12 initially transmitted directly be the UE and brought by the DeNB to the core network indicates that the UE, through a sub-network manner, demands the target network element to operate as a proxy, or carry a mapping relationship of corresponding ports. After receiving the GTP-C message, the DeNB discovers that the UE acts as a proxy of the SGW/PGW in the sub-network manner or converts the protocol into a GTP-C data packet (target IP=192.168.1.2, source IP=192.168.1.1, common GTP-C message) of sub-network1 based on the mapping relationship of the corresponding ports, and carries uplink TEID-C=121, transmits it to relay1 and stores the corresponding relationship of the uplink GTP-C between the (IP=10.10.10.111, TEID-C=111) and (IP=192.168.1.2, TEID-C=121). After receiving the data packet, relay1 creates a default bearer in step 4, feeds back the allocated IP addresses 192.168.1.2, carries downlink TEID-C=122, transmits (target IP=192.168.1.1, source IP=192.168.1.1, TEID-C=121) to the DeNB. After receiving it, the DeNB converts the data packet into (target IP=10.10.10.111, source IP=10.10.10.1, TEID-C=111) based on the previously created uplink GTP-C conversion relationship, and creates the corresponding relationship of the downlink GTP-C between (IP=192.168.1.2, TEID-C=122) and (IP=10.10.10.1, TEID-C=112). After receiving a response message, the MME transmits an S1 message, and sets up UE context (target IP=10.10.10.1, source IP=10.10.10.111, eNB S1-AP ID=22) containing uplink MME S1-AP ID=11 in step 5. After receiving the message, the DeNB converts the data packet into (target IP=192.168.1.2, source IP=192.168.1.1, eNB S1-AP ID=12) containing uplink MME S1-AP ID=11 based on the previous downlink S1AP conversion relationship, and locally stores the downlink S1-AP corresponding relationship between (IP=10.10.10.1, S1-AP=11) and (IP=192.168.1.2, S1-AP=11). After receiving a UE context setup message of step 6, relay1 reconfigures relay2 at the air interface of step 7 and creates a radio bearer (B1). Until now, relay2, as a UE, completes the access. Through the attach response message, the IP of relay2 is 192.168.1.2. The sub-network2 is also created. The network topology is shown in FIG. 15.

Thereafter, relay2 starts, as an eNB, the S1 setup procedure to set up the eNB. In sub-network2, relay2 regards relay1 as a proxy of the MME and SGW/PGW and an adjacent eNB, transmits an S1 setup message of step 8 to relay1. After converting the protocol, relay1 transmits the S1 setup message to the DeNB in sub-network1, and then transmits it to a real UE MME after conversion by the DeNB.

Through the UE access process of steps 11-17, transmission channels of C11, B11, A11, D11 are created, and the protocol conversion relationship of two gateways therein may be shown in the following table, where the IP is omitted, and IP matching in the process of matching table items may be also required. As shown in table 1:

TABLE 1

|  | DeNB | Relay1 |
| --- | --- | --- |
| downlink IP/SCTP/S1AP ID | 1011−>1021 | 1021−>1031 |
| Uplink IP/SCTP/S1AP ID | 1022−>1012 | 1032−>1022 |
| Uplink IP/UDP/GTP-C TEID | 1121−>1111 | 1131−>1121 |
| downlink IP/UDP/GTP-C TEID | 1112−>1122 | 1122−>1132 |
| Uplink IP/UDP/GTP-U TEID | 1221−>1211 | 1231−>1221 |
| downlink IP/UDP/GTP-U TEID | 1212−>1222 | 1222−>1232 |

The transmission channel to the UE SGW/PGW can be created, and the UE can enter the service network used by APP, such as Internet, through the UE SGW/PGW.

The above description is only the preferred embodiments of the present invention and is not intended to limit the protection scope of the present invention.

What is claimed is:

1. A relay communication system supporting multiple hops comprising:
    a donor node, at least one host node and a core network, wherein the donor node provides a wireless access connection to the at least one host node, and provides, as a gateway or a proxy, communication between the at least one host node and the core network;
    wherein the donor node is configured to be a gateway of data packets of a UE or a proxy of the core network, thereby the donor node is regarded as a core network for the at least one host node and as a host node for the core network; wherein the donor node forwards data packets received from the core network to the at least one host node, and forwards data packets received from the at least one host node to the core network;
    wherein the donor node is a relay which connects to a donor eNB via a wireless interface, and the host node is a relay; and
    the donor node provides conversion of protocols under the link layer to convert a Un radio bearer between the host node and the donor node into a Un radio bearer between the donor node and the donor eNB; or the donor node provides conversion of protocols under the transmission layer to convert a Un radio bearer and a protocol between the host node and the donor node into a Un radio bearer and a protocol between the donor node and the donor eNB.

2. The relay communication system according to claim 1, wherein the donor node converts, as a gateway, a message of a received protocol/protocol stack into a message of a protocol/protocol stack to be transmitted and transmits the message.

3. The relay communication system according to claim 1, wherein when the donor node acting as the gateway between the at least one host node and the core network and data packets reach the gateway, the gateway converts a source protocol stack into a target protocol stack based on the internal conversion relationship without changing the APP data that is packed into the APP layer of the protocol stack.

4. The relay communication system according to claim 1, wherein the donor node provides a wireless access connection for a User Equipment (UE) connected to the host node.

5. The relay communication system according to claim 1, wherein the wireless access connection is based on wireless cellular technologies, including Global System for Mobile Communication (GSM), Universal Mobile Telecommunications System (UMTS) and Long Term Evolution (LTE).

6. An access method of a relay communication system supporting multiple hops comprising:
    a host node maintaining a connection with a donor node and setting up an air interface connection with the donor node;
    the host node setting up a connection with a core network through the donor node;
    the donor node being configured to be a gateway, forwarding data between the host node and the core network; and the donor node further being configured to be a core network gateway that serves the host node, setting up a connection with the host node under control of a Mobility Management Entity (MME) and the MME assigning IP addresses for the host node; and
    the donor node sending requests to network element of the core network that serves the donor node for creating channels and IP addresses;
    wherein the donor node is a relay which connects to a donor eNB via a wireless interface, and the host node is a relay; and
    the donor node provides conversion of protocols under the link layer to convert a Un radio bearer between the host node and the donor node into a Un radio bearer between the donor node and the donor eNB; or the donor node provides conversion of protocols under the transmission layer to convert a Un radio bearer and a protocol between the host node and the donor node into a Un radio bearer and a protocol between the donor node and the donor eNB.

7. The access method according to claim 6, wherein the process of setting up the air interface is a RRC connection setup process; and the process of setting up the connection with the core network is an attach process.

8. The access method according to claim 6, wherein the core network gateway includes a Service Gateway (SGW) and/or a Packet data network Gateway (PGW).

9. The access method according to claim 6, wherein the action of the donor node sending requests to network element of the core network that serves the donor node for creating channels and IP addresses is triggered when the donor node sets up the connection with the host node under control of the MME and allocates the addresses while being configured to be the core network gateway.

10. An access method of a relay communication system supporting multiple hops comprising:
    a host node maintaining a connection with a donor node and setting up an air interface connection with the donor node;
    the host node setting up a connection with a core network through the donor node; and
    by being configured to be a gateway of data packets of a UE or a proxy of the core network, the donor node is regarded as a core network for the at least one host node and as a host node for the core network; the donor node forwards data packets received from the core network to the at least one host node, and forwards data packets received from the at least one host node to the core network;

wherein the donor node is a relay which connects to a donor eNB via a wireless interface, and the host node is a relay; and the donor node provides conversion of protocols under the link layer to convert a Un radio bearer between the host node and the donor node into a Un radio bearer between the donor node and the donor eNB; or the donor node provides conversion of protocols under the transmission layer to convert a Un radio bearer and a protocol between the host node and the donor node into a Un radio bearer and a protocol between the donor node and the donor eNB.

11. The access method according to claim 10, wherein the donor node is regarded as a core network specifically is that:

the donor node is configured to be a proxy of a core network MME and a proxy of the core network gateway;

while being configured to be the proxy of the core network MME, the donor node acts as a MME for the host node and acts as a host node for the MME;

while being configured to be the proxy of the core network gateway, the donor node acts as a core network gateway.

12. The access method according to claim 10, wherein while being configured to be the proxy of the core network gateway, the donor node sets up the connection with the host node under control of the MME and allocates addresses.

13. The access method according to claim 10, wherein the core network gateway includes a SGW and/or a PGW.

14. The relay communication system according to claim 1, wherein the wireless access connection is based on wireless cellular technologies, including Global System for Mobile Communication (GSM), Universal Mobile Telecommunications System (UMTS) and Long Term Evolution (LTE).

15. The relay communication system according to claim 2, wherein the wireless access connection is based on wireless cellular technologies, including Global System for Mobile Communication (GSM), Universal Mobile Telecommunications System (UMTS) and Long Term Evolution (LTE).

16. The access method according to claim 7, wherein the core network gateway includes a Service Gateway (SGW) and/or a Packet data network Gateway (PGW).

\* \* \* \* \*